United States Patent [19]

Osborn et al.

[11] Patent Number: 4,701,518
[45] Date of Patent: Oct. 20, 1987

[54] ANTIMICROBIAL NYLON PREPARED IN WATER WITH ZINC COMPOUND AND PHOSPHORUS COMPOUND

[75] Inventors: Scott E. Osborn, Cantonment; Vincent J. Farrugia, Pensacola, both of Fla.; LeMoyne W. Plischke, Lillian, Ala.; Chester C. Wu, Pensacola, Fla.

[73] Assignee: Monsanto Company, St. Louis, Mo.

[21] Appl. No.: 860,942

[22] Filed: May 8, 1986

[51] Int. Cl.$^4$ .................. C08G 69/28; C08G 69/04; C08G 69/16

[52] U.S. Cl. .................. 528/336; 523/122; 524/130; 524/133; 524/204; 524/414; 524/432; 524/600; 528/313; 528/319

[58] Field of Search .......... 528/336, 313, 319; 523/122; 524/130, 133, 204, 414, 432, 600

[56] References Cited

U.S. PATENT DOCUMENTS

| | | | |
|---|---|---|---|
| 2,205,722 | 6/1940 | Graves | 260/37 |
| 3,161,622 | 12/1964 | Harrington et al. | 260/78 |
| 3,345,541 | 10/1967 | Berry et al. | 260/78 |
| 3,509,107 | 4/1970 | Brignac | 260/78 |
| 4,200,707 | 4/1980 | Richardson | 528/336 |
| 4,401,712 | 8/1983 | Morrison | 428/289 |

OTHER PUBLICATIONS

Chemical Week/Oct. 27, 1982, p. 90, article entitled "Biocides vie for Carpet Markets".

G. F. Danna et al., Textile Research Journal, Mar. 1978, pp. 173-177, article entitled "Permox-A Hydrogen Perioxide-Zinc Acetate Antimicrobial Finish for Cotton".

"Zinc Oxide Properties and Applications", by Harvey E. Brown, pp. 76-80, published by International Lead Zinc Research Organization, Inc. (1976), 292 Madison, Avenue, New York, New York, 10017.

Primary Examiner—Harold D. Anderson
Attorney, Agent, or Firm—John W. Whisler

[57] ABSTRACT

Antimicrobial activity is imparted to nylon during its preparation by adding to the nylon-forming monomer(s), a zinc compound (e.g. zinc ammonium carbonate) and a phosphorus compound (e.g. benzene phosphinic acid). The compounds are added in amounts sufficient to form in situ a reaction product containing at least 300 ppm of zinc, based on the weight of nylon prepared. Fibers made from the resulting nylon contain the reaction product uniformly dispersed therein and have antimicrobial activity of a permanent nature.

11 Claims, No Drawings

ANTIMICROBIAL NYLON PREPARED IN WATER WITH ZINC COMPOUND AND PHOSPHORUS COMPOUND

BACKGROUND OF THE INVENTION

A. Field of the Invention

This invention relates to a process for providing nylon from which fibers having antimicrobial activity of a permanent nature can be made.

B. Description of the Prior Art

Certain silyl quaternary amines are useful antimicrobial agents for nylon carpet fibers. Commercially, these amines are applied to the fibers by various techniques which result in a coating on the surface of the fibers. Unfortunately, the treatment is not entirely effective, in that, carpets made from the treated fibers tend to lose their antimicrobial activity with time and to have reduced dye fastness to ozone and other atmospheric contaminants.

SUMMARY OF THE INVENTION

The present invention provides a simple means by which antimicrobial activity is imparted to nylon during the conventional melt polymerization process by which it is prepared. In the conventional melt polymerization process, the nylon-forming monomer(s) in water are heated under controlled conditions of time, temperature and pressure to remove water, effect polymerization of the monomers and provide molten fiber-forming nylon from which fibers can be made. The means comprises simply adding to the water along with the monomer(s) sufficient amounts of a zinc compound and a phosphorus compound of the formula

where R is an aromatic radical, such as phenyl, or an aliphatic radical, such as a lower alkyl radical, or hydrogen and R' is hydroxyl or hydrogen to form a reaction product in situ containing at least 300 ppm of zinc, based on the theoretical weight of nylon resulting from polymerization of the monomer(s). The addition of the zinc and phosphorus compounds to the water along with the monomers is viewed as being an improvement in the process whereby antimicrobial activity is imparted to the resulting nylon. Fibers shaped from the nylon contain the reaction product uniformly dispersed therein and have antimicrobial activity of a permanent nature and dye fastness to atmospheric contaminants. The reaction product is water-insoluble and thermally stable at temperatures in excess of 300° C.

In practicing the present invention, if the zinc compound is omitted from the fiber-forming monomers, the phosphorus compound tends to be removed from the fiber during subsequent finishing operations, such as, scouring or dyeing of the fiber. On the other hand, if the phosphorus compound is omitted from the fiber-forming monomers, the zinc compound tends to reduce the molecular weight of the nylon apparently by reacting with carboxyl end groups of the nylon during polymerization of the nylon monomers. The phosphorus component of the reaction product not only serves to tie up the zinc but also promotes polymerization, reduce thermal degradation of the nylon and enhance its dyeability.

DETAILED DESCRIPTION OF THE PREFERRED EMBODIMENTS OF THE INVENTION

Preferred phosphorus compounds useful in practicing the present invention are those in which R is phenyl or hydrogen and include by way of example phosphorous acid, benzene phosphinic acid, and benzene phosphonic acid.

Preferred zinc compounds useful in practicing the present invention are zinc oxide, zinc acetate, zinc ammonium carbonate and zinc ammonium adipate.

Nylons which are of commercial importance and prepared by the conventional melt polymerization process to which the present invention is an improvement are nylon 6 which is made by the polymerization of caprolactam and nylon 66 which is made by the polymerization of hexamethylenediammonium adipate (nylon 66 salt). Conventionally, the monomer (caprolactam or nylon 66 salt) is added to water at a temperature and at a concentration which provides a solution thereof. However, if desired, a slurry of the monomer could be used. Typically, the solution in the case of a nylon 66 salt solution, is then heated under pressure (e.g. 250 psig/$1825 \times 10^3 \text{n/m}^2$) to a temperature of, for example, about 245° C. Then the water vapor is exhausted off by reducing the pressure to atmospheric pressure while increasing the temperature to, for example, about 270° C. The resulting molten nylon is held at this temperature for a period of time to bring it to equilibrium prior to being extruded into flake or fiber. The process may be carried out in a batch or continuous mode.

The following examples are given to further illustrate the invention. In the examples "ppm", when used to express the amount of a material added to the nylon monomer(s), is based on the theoretical weight of nylon resulting from polymerization of the monomer(s).

EXAMPLE

In this example, nylon 66 yarns each composed of 300, 18 denier filaments were prepared by the conventional melt polymerization process utilizing the improvement of the present invention. In the preparation of these yarns 390 ppm of phosphorus, added in the form of benzene phosphinic acid, and zinc, added in the form of the compound given in the Table below, were added to the aqueous nylon 66 salt solution used to prepare each yarn. The amount of the zinc added in each instance is also given in the Table. Each yarn was then converted to carpet staple fibers which were ring spun into 3½ cotton count staple yarn. The staple yarn was then used to prepare cut pile carpet. The carpets were blank dyed and samples suitable for testing the antimicrobial activity of the yarn were made from the carpets. One sample of each of the carpets was tested by AATCC Test Method Number 100-1981 (inoculation swatch) using Klebsiella Pneumoniae as the test the organism, a method conventionally used in the industry to test the antimicrobial activity of carpet yarn. Another sample of each of the carpets was analyzed to determine the amount of zinc present in the yarn after blank dyeing. This was done by elemental analysis and the amount of zinc found is given in Table I in terms of ppm, based on the weight of the yarn.

In testing the antimicrobial activity of the samples, circular swatches (4.8 cm in diameters) of test and control samples are tested quantatively for antimicrobial activity. Briefly, test and control swatches are inoculated with the test organisms and incubated for a period of 6 hours. After incubation, the bacteria are eluted from the swatches by shaking in known amounts of liquid. The number of bacteria colonies present in this liquid is determined, and the percentage reduction by the treated fabric is calculated as follows:

$$\% \text{ reduction} = \left(1 - \frac{2A}{B+C}\right) \times 100$$

where A is the number of bacteria colonies recovered from the inoculated treated test fabric swatches incubated over the 6 hour period (6 hr contact time); B is the number of bacteria colonies recovered from the inoculated treated test fabric swatches immediately after inoculation (zero contact time); and C is the number of bacteria colonies recovered from the inoculated untreated control fabric swatches immediately after inoculation (zero contact time).

TABLE I

Antimicrobial Carpet Testing

| Sample No. | Zn Added As | Zn ppm Added | Zn* Analyzed ppm | Bacteria Colonies Reduction, % |
|---|---|---|---|---|
| 1 | Zn(NH$_4$CO$_3$)$_2$ | 500 | 466 | 88 ± 5 |
| 2 | " | 375 | 347 | 49 ± 5 |
| 3 | " | 250 | 238 | 31 ± 5 |
| 4 | ZnO | 500 | 460 | 83 ± 5 |
| 5 | " | 375 | 286 | 44 ± 5 |
| 6 | " | 250 | 213 | 33 ± 5 |
| Control | — | 0 | 0 | 0 |

*analyzed after blank dyeing

The results given in Table I show that the process of the present invention improves the antimicrobial activity of nylon fibers. Evaluation of the carpet samples showed that carpet Samples 1-6 were equal to or slightly superior to Control sample with regard to aesthetics, flammability, antisoiling and restorability characteristics and ozone resistance.

In other related experiments equally effective antimicrobial activity was obtained when benzene phosphinic acid was replaced with phosphorus acid containing a corresponding amount of phosphorus and when zinc ammonium carbonate or zinc oxide was replaced with zinc acetate or zinc ammonium adipate each containing a corresponding amount of zinc.

What is claimed is:

1. In a process for preparing nylon wherein nylon-forming monomer(s) in water is (are) heated under controlled conditions of time, temperature and pressure to remove water, effect polymerization of said monomer(s) and provide molten fiber-forming nylon, the improvement of imparting antimicrobial activity to the nylon by adding to the water along with the monomer(s) sufficient amounts of a zinc compound and a phosphorus compound of the formula

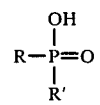

where R is hydrogen or an aromatic or aliphatic radical and R' is hydrogen or hydroxyl to form a reaction product in situ containing at least 300 ppm of zinc, based on the theoretical weight of nylon resulting from polymerization of the monomer(s).

2. The process of claim 1 wherein R is hydrogen.
3. The process of claim 1 wherein R is phenyl.
4. The process of claim 1 wherein the phosphorus compound is benzene phosphinic acid.
5. The process of claim 1 wherein the phosphorus compound is phosphorous acid.
6. The process of claim 1 wherein the zinc compound is zinc oxide.
7. The process of claim 1 wherein the zinc compound is zinc ammonium carbonate.
8. The process of claim 1 wherein the zinc compound is zinc ammonium adipate.
9. The process of claim 1 wherein the zinc compound is zinc acetate.
10. The process of claim 1 wherein the mole ratio of the phosphorus compound to the zinc compound added to said water is in the range of 2:1 to 1:1.
11. The process of claim 1 wherein said monomer is hexamethylene diammonium adipate.

* * * * *